United States Patent [19]
Caldwell et al.

[11] 3,771,627
[45] Nov. 13, 1973

[54] MODULAR BRAKE ASSEMBLY

[75] Inventors: Samuel I. Caldwell; John C. Wanner, both of Aurora, Ill.

[73] Assignee: Caterpillar Tractor Co., Peoria, Ill.

[22] Filed: Apr. 10, 1972

[21] Appl. No.: 242,724

[52] U.S. Cl. ............................ 188/170, 192/3 R
[51] Int. Cl. ............................................ B60t 13/10
[58] Field of Search ............. 188/72.3, 170, 206 R; 192/1, 3 R

[56] References Cited
UNITED STATES PATENTS

| 3,346,079 | 10/1967 | Davis et al. | 188/170 |
| 3,688,877 | 9/1972 | Day | 188/170 |
| 3,688,878 | 9/1972 | Barmasse | 188/170 |

*Primary Examiner*—Duane A. Reger
*Attorney*—Paul S. Lempio et al.

[57] ABSTRACT

The final drive for a track-type vehicle comprises a speed reduction gear train operatively connectible to a hydrostatic drive motor to drive a track engaging sprocket. A modular parking brake assembly is detachably mounted between the motor and gear train and comprises separable brake and brake actuating modules mounted in a housing to facilitate expeditious assembly and servicing.

14 Claims, 3 Drawing Figures

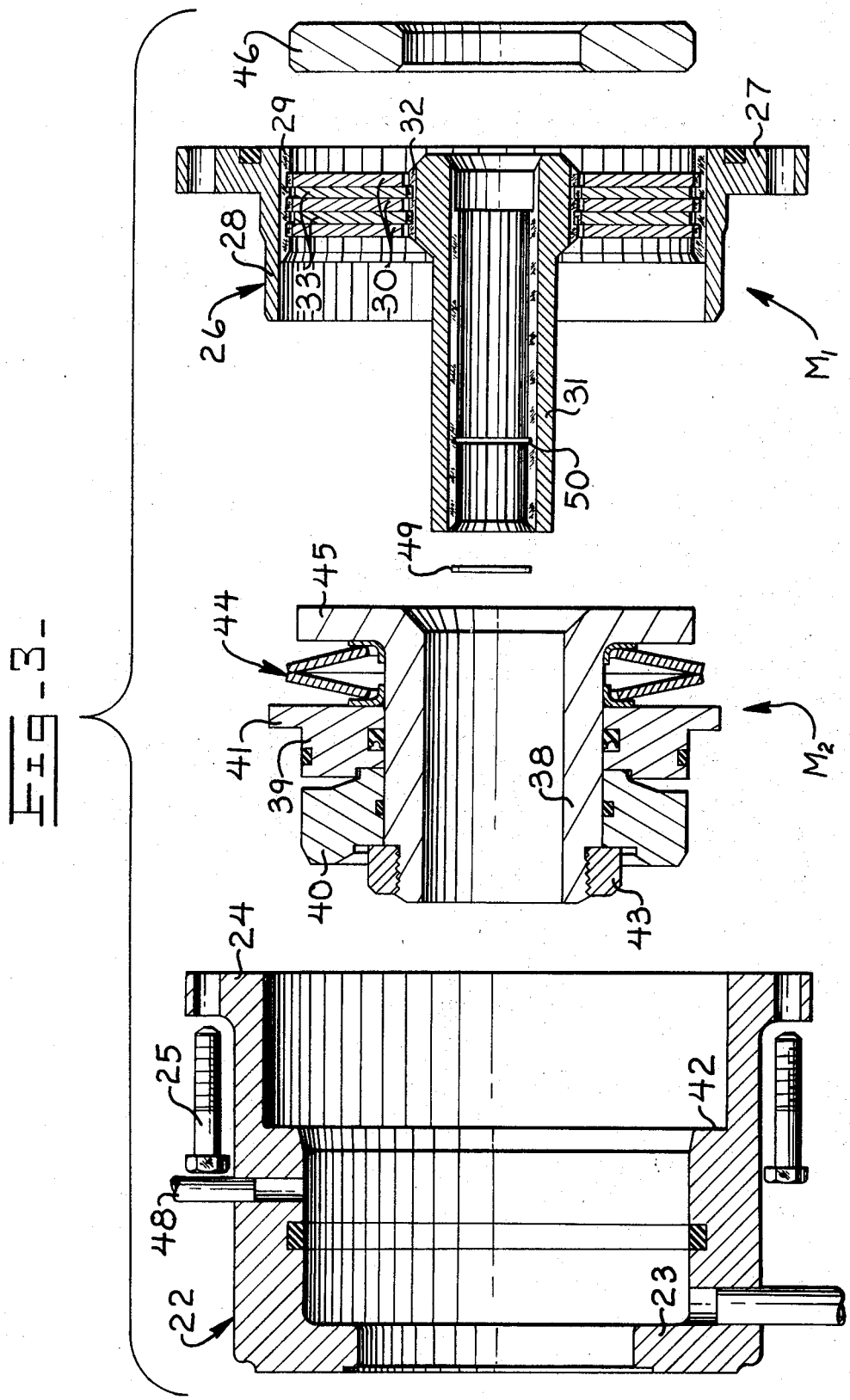

MODULAR BRAKE ASSEMBLY

BACKGROUND OF THE INVENTION

Conventional track-type vehicles, such as hydraulic excavators, oftentimes employ a pair of final track drives, each driven by a hydrostatic motor. During a parking or working mode of excavator operation the tracks are normally locked against movement by a suitably integrated parking brake. Servicing of a standard parking brake usually requires the complete disassembly of the drive train and attendant support structures. The inaccessibility of the parking brake and the inability to expeditiously replace or repair individual components thereof greatly inhibits such servicing.

SUMMARY AND OBJECTS OF THE INVENTION

Accordingly, an object of this invention is to provide a modular brake assembly adapted for expeditious disassembly to facilitate servicing or replacement of its individual components.

Another object of this invention is to provide the final drive for a track-type vehicle with such brake assembly whereby the brake assembly can be removed as a unit without exposing internal components thereof to dirt-laden environments and possible damage and without having to remove attendant major components of the vehicle.

Other objects and advantages of this invention will become apparent with reference to the accompanying drawings and following description.

BRIEF DESCRIPTION OF THE DRAWINGS

FIG. 3 is an exploded view of the FIG. 2 brake assembly.

DESCRIPTION OF THE PREFERRED EMBODIMENT

Figure 1:
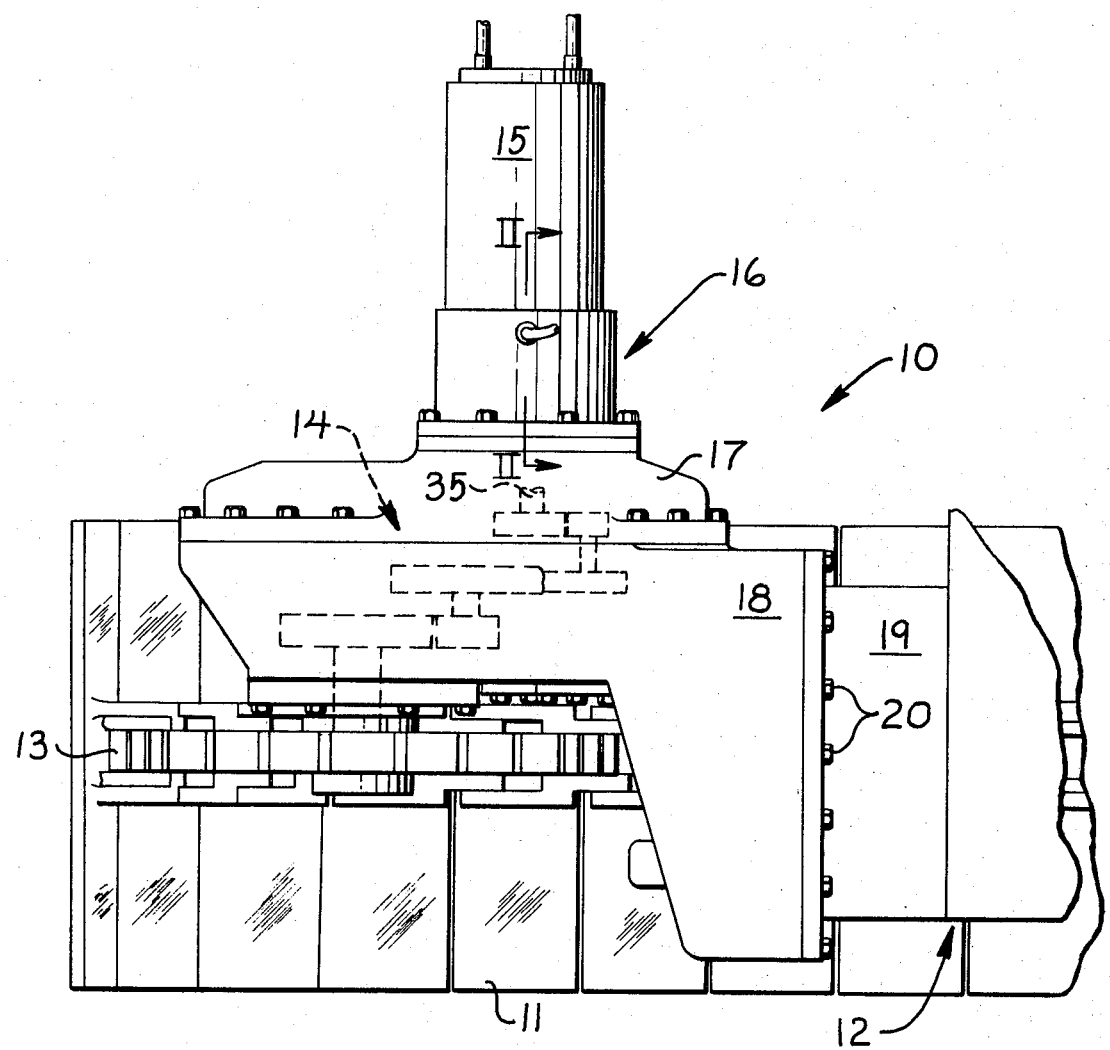
FIG. 1 is a partial top plan view of a final drive for a track-type vehicle, incorporating a modular brake assembly of this invention therein, and attendant support structures with a top portion of an endless track assembly removed therefrom for clarification purposes.

Referring to FIG. 1, a mobile undercarriage 10 of a track-type vehicle, such as a hydraulic excavator, comprises a pair of laterally spaced and parallel endless track assemblies 11 (one shown). Each track assembly is suitably mounted on a track frame 12 to be driven by a bull wheel or drive sprocket 13 via a final track drive transmission 14 and a motor means, such as a hydrostatic motor 15. The herein described transmission, motor means and associated track assembly are duplicated on the opposite side of the excavator.

A modular brake assembly 16 of this invention is detachably connected between the motor means and transmission, which may comprise the schematically illustrated speed reduction gear train contained in a multi-part transmission housing 17. The housing is detachably mounted at a forwardly disposed mounting face 18 to a flush, rearwardly disposed mounting flange 19 of track frame 12 solely by a plurality of fastening means, such as bolts 20. Although such modular brake assembly is herein described in association with the illustrated endless track-type vehicle, it should be understood that the invention principles incumbent with such brake assembly may be employed in a wide variety of brake or clutch applications.

Figure 2:
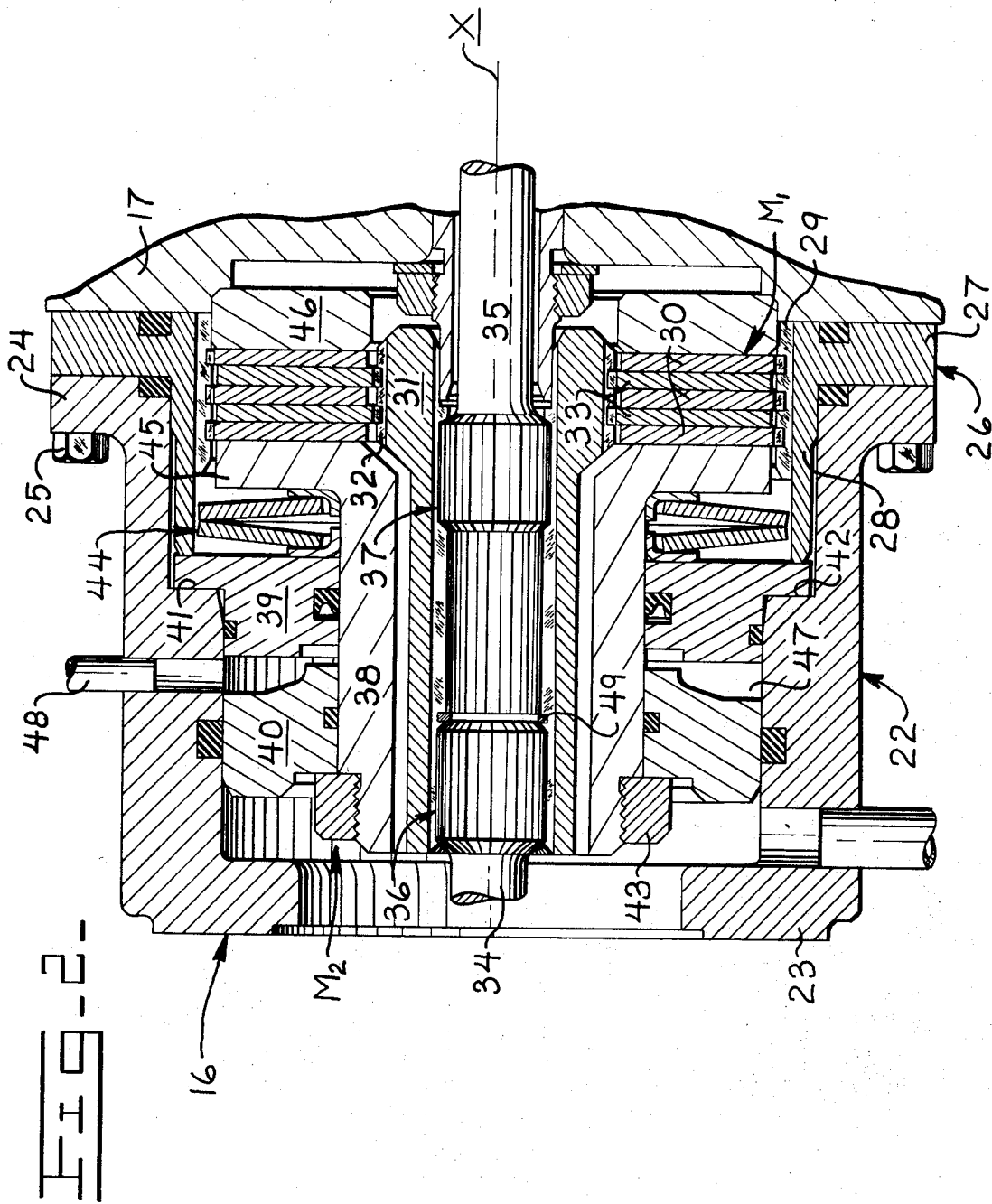
FIG. 2 is an enlarged, vertical section of the brake assembly, taken in the direction of arrows II—II in FIG. 1.

Referring to FIGS. 2 and 3, the modular brake assembly is disposed on a longitudinal axis X and comprises an annular housing 22 having an annular flange 23 formed on one end thereof for attachment by fastening means (not shown) to the housing of motor means 15. A second annular flange 24 is formed on the opposite end of the housing for attachment to transmission housing 17 by circumferentially disposed bolts 25. An annular adapter 26 of a brake module $M_1$ has a radial flange 27 secured between housings 17 and 22 and a longitudinally extending tubular portion 28 closely fitted within a counterbore formed in housing 22.

A spline 29 is formed internally on the adapter to mount the outer periphery of a first group of friction discs 30 for axial movement therewithin. An elongated sleeve 31 comprises an external spline 32 for mounting a second group of interleaved friction discs 33 for axial movement thereon. Input or motor shaft 34 and output or transmission shaft 35 are attached to sleeve 31 by axially spaced spline connections 36 and 37, respectively. The friction discs comprise braking means for normally holding the sleeve to prevent the input shaft from driving the output shaft.

A brake actuating module $M_2$ comprises a cylindrical hub 38 having an annular positioning ring 39 and an axially spaced annular piston 40 slidably mounted thereon. A radial flange 41 of the positioning ring is clamped between a radially disposed surface 42 of housing 22 and the inner end of tubular portion 28 of the adapter. A nut 43 is threadably mounted on the end of the hub to provide means for selectively presetting the compression of a spring means 44.

The spring means, preferably comprising back-to-back Belleville washers, is mounted on the hub between a hub flange 45 and positioning ring 39 to normally compress brake discs 30 and 33 together against a combined backup and piloting ring 46. The brake may be released by communicating pressurized oil to an annular chamber 47 via an inlet 48. The chamber is defined between the positioning ring 39 and piston 40 and forms part of the vehicle's integrated hydraulic control system (not shown).

Such pressurization will move piston 40 leftwardly to engage nut 43 which in turn moves hub flange 45 leftwardly to compress spring means 44. Compression of the spring means will thus release sleeve 31 to permit input shaft 34 to drive output shaft 35. When the pressurized oil in chamber 47 is exhausted, the spring means will expand automatically to restore the brake to its normally engaged, FIG. 2 position.

ASSEMBLY OF THE PREFERRED EMBODIMENT

As best shown in FIG. 3, brake module $M_1$ is preassembled into a unit to comprise concentrically disposed sleeves 26 and 31, mounted together by interleaved brake discs 30 and 33. A snap ring 49 is then inserted into an annular groove 50 formed internally on the splines of sleeve 31. Brake actuating module $M_2$ is also preassembled into an independent unit comprising hub 38, positioning ring 39, piston 40, spring means 44 and retaining nut 43. As suggested above, the nut may be adjusted axially on the hub to impose a predetermined compressive load on the spring means which is carefully calibrated to assure full release of the brake means upon pressurization of chamber 47.

The preassembled brake actuating module M₂ is first slidably inserted into housing 22 until radial flange 41 of positioning ring 39 abuts shoulder 42 of the housing. The brake module is joined to the structure by telescopically inserting elongated sleeve 31 into hub 38 until flange 27 of adapter 26 axially abuts flange 24 of the housing.

The modular brake assembly is then mounted as a unit on transmission housing 17 and radially aligned therewith by piloting ring 46 which abuts an outer brake disc 30 and mounts sleeve 26 thereon. Output shaft 35 is suitably engaged with sleeve 31 at spline connection 37 and bolts are secured to housing 17. Input shaft 34 is attached to the sleeve 31 at spline connection 36 and motor 15 is otherwise suitably attached to the brake assembly to selectively drive transmission 14 and track engaging sprocket 13 upon release of the brake means.

In view of the foregoing, it is readily apparent that the present invention provides an improved modular brake assembly for a vehicle that is removable as a unit therefrom. It is also apparent that the invention further provides for expeditious disassembly of the brake and brake actuating modules from the housing for servicing or replacement purposes.

While the invention has been described and shown with particular reference to the preferred embodiment, it is apparent that variations might be possible that would fall within the scope of the present invention, which is not limited except as defined in the following claims. For example, the brake assembly could be utilized in braking applications other than those incumbent with respect to the selective braking of a final drive transmission for a track-type vehicle. Also, this invention is adapted for use in clutching applications wherein housing 22 and structures attached thereto, for example, are rotatably mounted in a transmission or like device for selectively coupling them to shaft 34 and/or 35 through coupling means comprising friction discs 30 and 33.

What is claimed is:

1. A modular final drive in combination with a track-type vehicle, said final drive comprising
    a track driving sprocket,
    a multi-geared transmission, including a transmission shaft, drivingly connected to said sprocket,
    a motor means, including a motor shaft axially aligned with said transmission shaft, for selectively driving said transmission and
    a modular brake assembly detachably connected axially between said motor means and said transmission, including braking means for selectively permitting said motor means to drive said transmission and a sleeve connecting said transmission shaft to said motor shaft.

2. The invention of claim 1 wherein said modular brake assembly sequentially constitutes a housing attached between said motor means and said transmission, a brake actuating module removably mounted in said housing and a brake module partially mounted within said braking actuating module and attached to said housing.

3. The invention of claim 2 wherein said housing and said brake module comprise a radially disposed flange attached to a housing of said motor means.

4. The invention of claim 2 wherein said sleeve is centrally disposed in said brake module and wherein said motor and transmission shafts are operatively connected to opposite ends of said sleeve.

5. The invention of claim 4 wherein said brake module further comprises an annular adapter disposed about said sleeve and wherein a plurality of interleaved friction discs of said braking means are alternately mounted for axial movement on said adapter and on said sleeve.

6. The invention of claim 5 further comprising a piloting ring detachably mounted between a housing of said transmission and said friction discs and having said adapter mounted thereon to radially position said brake assembly in said housing.

7. The invention of claim 5 wherein said brake actuating module comprises a cylindrical hub mounted on said sleeve and having a radially disposed hub flange positioned adjacent to said friction discs and spring means positioned adjacent to said hub flange for normally compressing said friction discs to engage said braking means.

8. The invention of claim 7 wherein said brake actuating module further comprises an annular positioning ring mounted on said hub and having a flange abutting a radially disposed surface formed interiorly on said housing to axially position said brake actuating module therein.

9. The invention of claim 8 wherein said brake actuating module further comprises an annular piston mounted for axial movement on said hub and chamber means defined between said piston and said positioning ring for moving said piston axially into engagement with said hub to in turn move said hub flange axially to compress said spring means upon pressurization of said chamber means.

10. The invention of claim 7 further comprising means mounted on said hub for selectively adjusting the normal compressive load imposed on said spring means.

11. A modular brake assembly adapted for attachement to the final drive housing of a vehicle comprising:
    a brake module comprising an elongated sleeve, an annular adapter disposed about said sleeve and a plurality of annular friction discs alternately internally and externally splined to and operatively interposed between said sleeve and said adapter,
    a brake actuating module comprising a cylindrical hub having a radially outwardly disposed flange secured thereon, an annular piston mounted for axial movement on said hub and spring means disposed between said flange and said piston,
    a housing enclosing said modules therein and
    means removably and telescopically mounting said modules together in said housing for permitting expeditious disassembly and independent servicing of the modules.

12. The modular brake assembly of claim 11 wherein said housing includes means forming a bore therein snuggly receiving said brake actuating module, and means forming a counterbore extending axially from said bore and concentrically disposed therewith to define a radially disposed shoulder axially positioning said brake actuating module in said housing.

13. The modular brake assembly of claim 12 wherein said housing further includes a radially outwardly extending annular flange formed thereon adapted for mounting said brake assembly on the final drive housing of a vehicle.

14. A modular brake assembly mounting comprising a final drive housing for a vehicle having a drive shaft exiting therefrom and a counterbore concentrically disposed about said drive shaft, a brake unit having means forming a bore on one end thereof adapted for mounting on said housing and a plurality of annular friction elements disposed in said brake unit, and annular combined backup and piloting means comprising a separate annular member abutting one side of said friction elements and disposed in bridging relationship between the counterbore of said housing and the bore of said brake unit to precisely position the brake unit on said housing.

* * * * *